Sept. 27, 1932.  J. D. ZAHM ET AL  1,879,968
ANIMAL TRAP
Filed Sept. 26, 1930
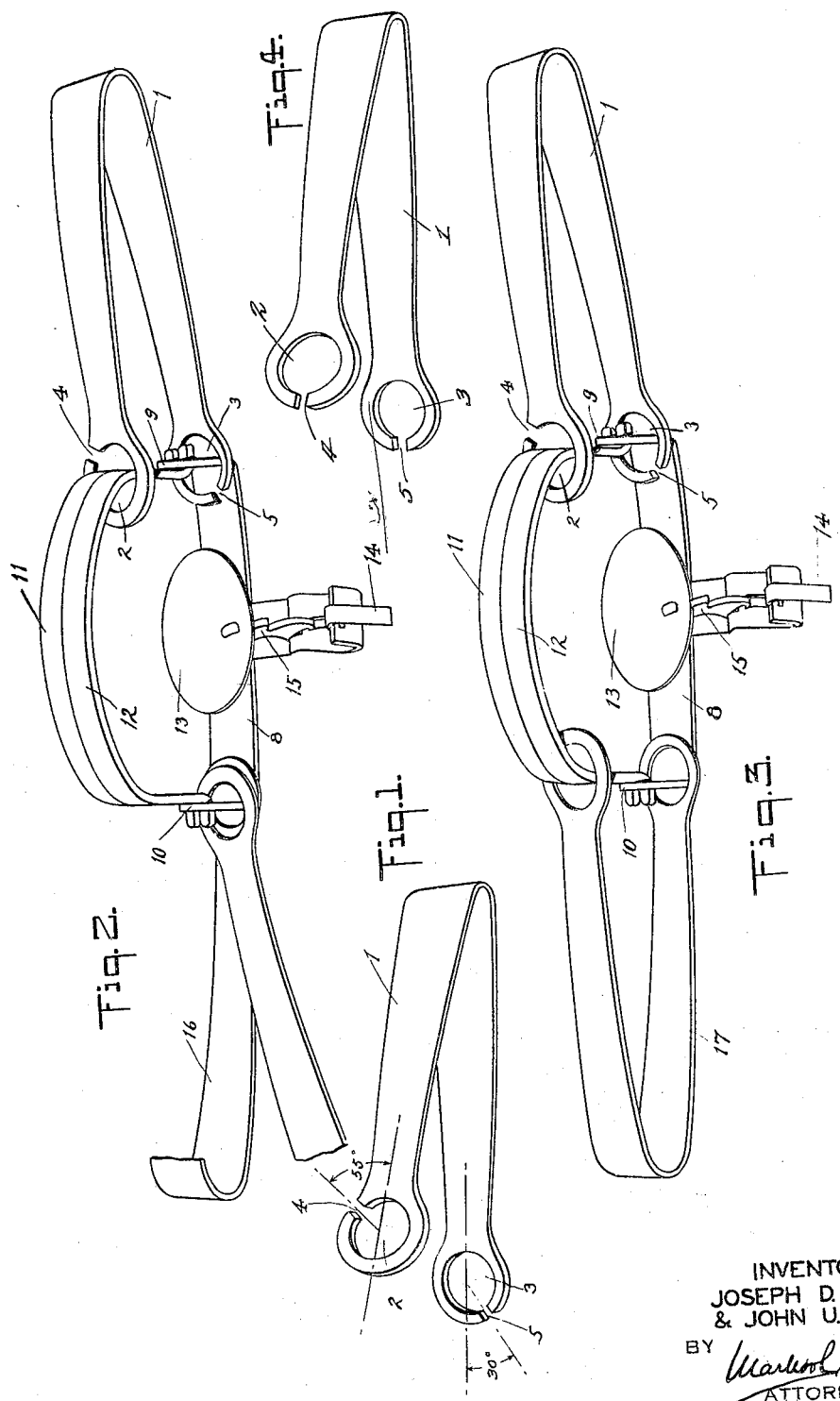
INVENTORS
JOSEPH D. ZAHM
& JOHN U. LEHN
BY
ATTORNEYS Patented Sept. 27, 1932

1,879,968

UNITED STATES PATENT OFFICE

JOSEPH D. ZAHM AND JOHN U. LEHN, OF LITITZ, PENNSYLVANIA, ASSIGNORS TO ANIMAL TRAP COMPANY OF AMERICA, OF LITITZ, PENNSYLVANIA, A CORPORATION OF PENNSYLVANIA

ANIMAL TRAP

Application filed September 26, 1930. Serial No. 484,494.

This invention relates to spring actuated animal traps.

In such traps it is a possible contingency that the spring will break and in emergencies this may cause considerable difficulties.

It is an object of this invention therefore, to provide a supplementary spring which can be operatively attached without the use of tools to such traps after the assembly of the same. We provide therefore, a supplementary attachable and detachable spring and it will be obvious that such a spring may be used on traps which are fully operative, and by such use the spring power of the trap may be increased.

In a preferred construction the spring is provided with slots so that parts of the trap may be passed therethrough.

Further detailed features of the invention will be apparent from the following description taken in conjunction with the accompanying drawing in which:—

Figure 1 is a perspective view of a convenient and preferred embodiment of the invention comprising a spring adapted to be attached to an animal trap;

Figure 2 is a view showing the spring of Figure 1 applied to a trap whose normal spring is broken;

Figure 3 is a view showing the spring of Figure 1 applied to a fully operative trap, in order to increase its spring power; and Figure 4 is a perspective view of a modified form of spring according to the invention.

Referring to the drawing, and particularly to Figure 1, there is shown there one convenient and specific embodiment of the invention comprising a spring member 1 preferably of U-form and also preferably made from sheet metal. At each end of the spring, or at the end of each limb, there is an aperture 2, 3 and cut in the encircling part of the apertures are slots 4 and 5. These slots should be of sufficient width to allow the passage therethrough of the appropriate parts of the trap to which they are applied. It will be noted that in the upper limb shown in Figure 1, the slot 4 makes an angle of approximately 55° with the direction of such limb, and that the lower slot 5 makes an angle of approximately 30° with the axis of its limb. These angles however, are on opposite sides of a transverse line at right angles to the axes and the slots are therefore, in opposite quadrants of the circular apertures 2 and 3.

One convenient use of the spring illustrated in Figure 1 comprises its application to a trap whose normal spring is broken. Such a trap is illustrated in Figure 2 and comprises a base 8 having its ends upturned as at 9 and 10 and upon such ends are pivoted the usual jaws 11 and 12. Mounted upon the base is any convenient form of bait pan 13 and catch 14 adapted to coact with a notch 15 in the bait pan support and hold the jaws in open position.

Upon one end of the base is mounted the usual spring 16 and in this case it is assumed that the spring is broken and the trap is therefore, useless according to usual notions.

In accordance with this invention the trap may be made completely operative by the application of a novel form of spring and such is indicated as attached to the right hand end of the trap as shown in Figure 2. It will be seen from this that the upturned end 3 of the base 8 has been passed through the slot 5 of the lower limb of the spring 1 and the upstanding parts of the jaws 11 and 12 have been passed through the slot 4 in the upper limb of the spring. In order to effect this arrangement the base is first passed through the slot 5 and the spring is then compressed and the jaws are then passed through the slot 4. The trap is thus provided with a new spring and is completely operative. Obviously the spring could be applied to that end of the trap at which the broken spring is situated.

A further use of the spring according to this invention is to supplement the ordinary spring and thus have an extremely strong trap. Such an application is illustrated in Figure 3 where a common form of trap substantially as illustrated in Figure 2 has its normal spring 17 completely in order. In order to supplement the spring 17 and have a stronger pressure on the jaws 11 and 12 the spring, according to this invention, is applied in the manner above indicated and as illustrated on the right of Figure 3. The spring could of course be applied at the other end.

It is pointed out that the angular relation of the slots above indicated and as illustrated in Figure 1 may be varied as required. The slots may be in the opposite quadrants of their respective circular ends so that the spring may be turned, relative to the trap when connected thereto, in the opposite direction to that most favourable to the embodiment shown. The spring, when applied to the trap, may be turned at any convenient angle instead of being along the axis thereof as illustrated in Figures 2 and 3, and according to the position of the slots so the direction and amount of turn is predetermined. If desired the ends of the limbs surrounding the apertures 2 and 3 may be thickened in order to provide additional strength to compensate for the weakness due to the cutting of the slots.

Other modifications and variations of the invention will suggest themselves to those skilled in the art and the invention is not to be limited to the specific disclosure hereinbefore described which is given purely by way of example to indicate how the invention may be carried into effect.

We claim:

A U-shaped spring for an animal trap comprising jaws and a base, said spring having enlarged rounded ends and apertures in said ends, slots being provided leading to said apertures and in opposite quadrants of the respective ends.

In testimony whereof we affix our signatures.

JOSEPH D. ZAHM.
JOHN U. LEHN.